(12) United States Patent
Arrington

(10) Patent No.: US 8,147,639 B2
(45) Date of Patent: Apr. 3, 2012

(54) PROCESS FOR MANUFACTURING FREE STANDING THERMOPLASTIC POLYMERIC FILMS

(75) Inventor: Eric Arrington, Canandaigua, NY (US)

(73) Assignee: TriPartisan Technologies, LLC, Canandaigua, NY (US)

( * ) Notice: Subject to any disclaimer, the term of this patent is extended or adjusted under 35 U.S.C. 154(b) by 271 days.

(21) Appl. No.: 12/467,288

(22) Filed: May 17, 2009

(65) Prior Publication Data

US 2009/0288764 A1    Nov. 26, 2009

Related U.S. Application Data

(60) Provisional application No. 61/055,369, filed on May 22, 2008.

(51) Int. Cl.
*B32B 37/02* (2006.01)
(52) U.S. Cl. .............. 156/247; 156/229; 156/244.11; 156/289; 156/701; 264/210.1; 264/210.2; 264/211.12
(58) Field of Classification Search .............. 156/229, 156/247, 244.11, 289, 344, 701; 264/176.1–211.24
See application file for complete search history.

(56) References Cited

U.S. PATENT DOCUMENTS

| | | | |
|---|---|---|---|
| 3,322,870 A | 5/1967 | Sacks | |
| 3,337,665 A | 8/1967 | Underwood et al. | |
| 3,880,691 A | 4/1975 | Pannenbecker et al. | |
| 4,379,117 A | 4/1983 | Baird, Jr. et al. | |
| 4,826,493 A | 5/1989 | Martini et al. | |
| 4,885,119 A | 12/1989 | Mueller et al. | |
| 5,051,222 A | 9/1991 | Marten et al. | |
| 5,051,298 A * | 9/1991 | Landry et al. | 428/220 |
| 6,201,083 B1 | 3/2001 | Asrar et al. | |
| 7,686,987 B2 * | 3/2010 | Bermel | 264/1.34 |
| 2002/0034610 A1 * | 3/2002 | Perez et al. | 428/141 |

OTHER PUBLICATIONS

Continental Polymers, Cast Film, webpage article, Mar. 26,2008, 1 page, Continental Polymers, United Kingdom, http://www.contpoly.co.uk/CAST.htm.
Omniflex, Precision Cast-On=Carrier or Blown Film Extrusion, webpage, 2 pages, US, http://www.omniflexfilms.com/extrusion.htm, 2006.
PP 521P PP Homopolymer for Bi-axially oriented film, Product Description, p. 1, Sabic, Riyadh, Kingdom of Saudi Arabia, Feb. 2009.
Song Cheng and Ed Phillips, Rheological Studies on Radiation Modified Polyethylene Resins, Sterigenics Advanced Applications, San Diego, CA, 2006.

* cited by examiner

*Primary Examiner* — Khanh P Nguyen
*Assistant Examiner* — Margaret Squalls
(74) *Attorney, Agent, or Firm* — Tracy Jong Law Firm; Tracy P. Jong; Cheng Ning Jong

(57) ABSTRACT

This invention discloses a novel process for manufacturing very thin freestanding polymeric films with the steps of supplying a molten film layer stream and a molten assist layer stream by a first extruder and second extruder; intimately contacting the film layer stream and the assist layer stream in coplanar fashion; extruding the film layer stream and the assist layer stream through a planar coextrusion die lip; stretching the multilayer melt curtain; cooling the multilayer film; delaminating the assist layer or layers from the film layer; and transporting the film layer to downstream processing operations. This process allows manufacturing of very thin freestanding films made from amorphous polymers, highly filled films made from amorphous, semi crystalline, or crystalline polymers, chemically cross linked films, and films with diffused addenda that would normally cause undesirable reactions in an extrusion environment.

34 Claims, 5 Drawing Sheets

Amorphous Film Extrusion

PROCESS FOR MANUFACTURING FREE STANDING THERMOPLASTIC POLYMERIC FILMS

CROSS REFERENCE TO RELATED APPLICATIONS AND PRIORITY CLAIM

This application claims the benefit of priority from U.S. Ser. No. 61/055,369 entitled "Process For Manufacturing Free Standing Thermoplastic Polymeric Films" filed by Eric Arrington on May 22, 2008.

BACKGROUND OF THE INVENTION

1. Field of the Invention

This invention relates to polymeric films and more particularly, to a novel process for manufacturing very thin free-standing polymeric films.

2. Description of Related Art

Very thin, freestanding polymeric films have a multitude of uses in today's world, including packaging, membranes, dielectric films, and diffusion release control for drug applications. Although films can be coated onto other substrates which are nanometers in thickness, these are not freestanding films, since they cannot be peeled off the substrate and handled in a robust way.

There are currently several manufacturing methods for making very thin freestanding films in commercial quantities. Each genre of manufacturing techniques has distinct drawbacks and disadvantages with respect to thin freestanding polymeric films.

Blown films are made by melting the polymer using an extruder, forcing the polymer melt through a vertical annular die, and keeping the resulting cylindrical column of polymer from collapsing by using high pressure air in the middle of the annulus. This air also cools the polymer, causing it to solidify into a flexible, polymeric annulus. The annulus is then slit and wound to form a roll of film. This technique is frequently used to make grocery bags out of high density polyethylene and other materials. It is fairly inexpensive, and capital costs are low compared to other methods. The disadvantage of this technique is that it is primarily limited to a narrow range of olefinic polymers such as polyethylene, and the thickness variability of the resulting film is often poor. The polymers must be "shear thinning" to be economical, since Newtonian polymers which do not have reduced viscosity under the high shear conditions of the annular die will have a very high pressure drop associated with them. This high pressure can damage the equipment and limit the productivity of the extrusion operation. The blown film process is also limited in the degree of filler such as amorphous silica or carbon black which can be used. The presence of filler usually dramatically increases the viscosity (and therefore the pressure drop) of the melt. This filler also reduces the melt strength, resulting in instability of the vertical column of polymer and causing repeated breaks. This would limit the minimum thickness of the films made with such a process, as well as the productivity and economics derived.

Chemically cross linked polymers cannot be used for the same reason that high fillers cannot be incorporated, in particular, they would cause an exceedingly high pressure drop. In addition to equipment limitations, the high pressure drop which would result causes a phenomenon called "melt fracture" through the die. Melt fracture results in very poor extruded quality.

Another well established technique used in the manufacture of films is the cast film process. In the cast film process, the polymer is again melted in an extruder, and forced through a rectangular die (rather than an annular die used in blown film). The rectangular die is usually a coat hanger, horseshoe or T type die, where the resulting polymer melt is subsequently cooled on chill rollers and then wound to form a plastic roll. Like the blown film technology, this technique has a relatively low capital cost, and can be used on a slightly wider array of materials. A depiction of the prior art cast film process is shown in FIG. 1, where the film is low density polyethylene (LDPE). Cast film gives a film with much better thickness uniformity than blown film. The disadvantage of the cast film process is that, like blown film, the thickness and speed of the extruded materials made using this technique depends on the melt strength of the thermoplastic which is being extruded. There are many valuable thermoplastics such as polycarbonate, polymethyl methacrylate, and other amorphous polymers which do not have good melt strength. As used in this specification, an amorphous plastic means a polymer having less than 5% crystallinity as measured by differential scanning calorimetry. If an attempt is made to extrude these amorphous thermoplastics as a thin film, the result will be as shown in FIG. 2, where the melt curtain has broken and the film making process interrupted. Thus, the cast film process works adequately when trying to make thick films from amorphous polymers (>10 um), but it works poorly when making very thin films. In addition, when highly loaded films such as films with fillers like carbon nanotubes, or silica particles are desired, the cast film processes is again limited because the addition of these materials also contributes to the reduction in melt strength. Therefore the cast film process for making highly loaded films is limited to making thick films or sheets. Highly cross linked polymers also cannot be processed in cast films for the same reasons as described with respect to blown films, namely exceedingly high pressure and melt fracture.

A third well established technique uses solvent coating. In this method, a polymer is dissolved in a suitable solvent, and then cast through a rectangular coat hanger, horseshoe die T die or X-hopper (depending on the viscosity), and coated onto a surface such as a large roll or band where the solvent is subsequently evaporated. When enough of the solvent has been evaporated, the web can be peeled off the roll or band, dried further, and then wound into roll form. This process has been used for decades to make thick cellulose triacetate films. The advantage of this process is that it can be used to make very thin films of some amorphous plastics (depending on solubility, such as polycarbonate in trichloromethane) and it can be further used to process some non-thermoplastic polymers such as unplasticized polyvinyl alcohol. The disadvantages of this approach are (1) high capital cost for equipment necessary to handle the solvents and for drying the solvents, (2) many of the solvents used for dissolving polymers are toxic or carcinogenic, (3) the process is slow due to diffusion control of the drying process, (4) it is very difficult to remove the last 1% or so of the solvent, which results in an impurity which may not be desired, and (5) some plastics are not even soluble in commonly available solvents or solvent combinations. In addition, films highly loaded with fillers cannot be made unless dispersing agents are added to the filler to prevent premature precipitation. This dispersant is often an undesirable impurity.

Another well established technique to make thin freestanding films uses biaxial orientation of a thick sheet. In this technique, the polymer is melted in an extruder, and forced through a slot die and onto a chilled roller, as with the cast film process. This produces a thick sheet of the polymer. The polymer is then reheated and biaxially oriented, usually in a two step process, drafting the sheet in the machine direction first, which increases the machine direction speed and reduces the thickness, and then by tentering in the cross direction, increasing the width and further decreasing the thickness of the film. This method is frequently used to great advantage in making polyester films from polyethylene terephthalate and polypropylene films in the BOPP (biaxially oriented polypropylene) process for food wrappers or garbage bags. The advantage is that it can be used to make exceedingly thin films (of crystalline and semi crystalline polymers), often in the one micron range. It can also be used for highly filled webs, but only if voiding of the film is desired. The disadvantages are (1) high capital cost, often in the $100 M range, and (2) required use of crystalline polymers or semi crystalline polymers like polyethylene terephthalate and polypropylene to be of good advantage. The process cannot be readily adapted to significantly biax amorphous polymers like acrylic or polycarbonate, and (3) it is difficult to use cross linked polymers since these will not orient biaxially without tearing the web.

The above mentioned approaches are all widely used and are firmly entrenched commercial manufacturing techniques. However, all of these methods have difficulty in economically making some important types of freestanding films. These types of films include: very thin freestanding films made from amorphous polymers like polycarbonate, polymethyl methacrylate, polysulfone and others; highly filled films made from amorphous, semi crystalline, or crystalline polymers; and chemically cross linked films. A method of manufacturing these film types would be highly desirable.

Very thin freestanding films made from amorphous polymers like polycarbonate, polymethyl methacrylate, polysulfone and others would be useful for dielectric films, protective films or optics films to provide an excellent gloss, membranes, or other uses. Highly filled films made from amorphous, semi crystalline, or crystalline polymers would be useful for making conductive films, highly pigmented films, or films filled with reinforcing fillers. Chemically cross linked films would provide a technique for making insoluble and durable films such as epoxy films or modified polyvinyl alcohol films useful for ethanol pervaporation membranes.

SUMMARY OF THE INVENTION

In accordance with this invention, there is disclosed a process comprising the steps of supplying a molten film layer stream and a molten assist layer stream by extruders; intimately contacting the film layer stream and the assist layer stream in coplanar fashion; extruding the film layer stream and the assist layer stream through a planar coextrusion die lip; stretching the multilayer melt curtain; cooling the multilayer film; delaminating the assist layer or layers from the film layer; and transporting the film layer to downstream processing operations.

It is an object of the present invention to provide an improved process for manufacturing very thin free standing polymeric films.

It is an object of the present invention to provide an improved process for manufacturing very thin freestanding films made from amorphous polymers like polycarbonate, polymethyl methacrylate, polysulfone and others.

It is an object of the present invention to provide an improved process for manufacturing very thin freestanding highly filled films made from amorphous, semi crystalline, or crystalline polymers.

It is an object of the present invention to provide an improved process for manufacturing very thin freestanding chemically cross linked films.

It is an object of the present invention to provide an improved process for manufacturing very thin freestanding films with diffused chemical addenda.

It is yet another object of the present invention to provide a very thin free standing polymeric film that is durable and reliable.

It is yet another object of this invention to provide a process for manufacturing very thin free standing polymeric films that is economical from the viewpoint of the manufacturer and consumer, are susceptible of low manufacturing costs with regard to labor and materials, and which accordingly are then susceptible of low prices for the consuming public, thereby making them economically available to the buying public.

Whereas there may be many embodiments of the present invention, each embodiment may meet one or more of the foregoing recited objects in any combination. It is not intended that each embodiment will necessarily meet each objective.

Thus, having broadly outlined the more important features of the present invention in order that the detailed description thereof may be better understood, and that the present contribution to the art may be better appreciated, there are, of course, additional features of the present invention that will be described herein and will form a part of the subject matter.

In this respect, before explaining at least one embodiment of the invention in detail, it is to be understood that the invention is not limited in its application to the details and arrangements of the process steps set forth in the following description or illustrated in the drawings. The present invention is capable of other embodiments and of being practiced and carried out in various ways. Also it is to be understood that the phraseology and terminology employed herein are for the purpose of description and should not be regarded as limiting.

PARTICULAR ADVANTAGES OF THE INVENTION

The present invention discloses a significantly modified cast film process that offers particular advantages not previously known in the art with known prior art processes. Thin polymer films having a thickness of less than 10 μm may be manufactured under conditions that allow substantially uniform thickness and especially films that are biaxially oriented to reduce thickness. The presence of the assist layer in the novel process allows for much higher drawdown ratios than would otherwise be possible, and therefore much thinner films. This drawdown is accomplished by having the cooling apparatus running at a higher velocity than the polymer coming out of the die.

In the novel process, the multilayer melt curtain is stretched while still in the molten state, significantly reducing its thickness, since it is coextruded with a sufficient supporting assist layer that functions as a mechanical support layer to keep the film layer from breaking during the drawdown phase of the process. This overcomes curtain break problems experienced in the prior art processes.

Since each layer is separately shaped into a film, and then the various films may be brought into contact at the last second, the individual polymer layers can be different temperatures and viscosities. This novel process enables very thin freestanding films made from amorphous polymers and highly filled films made from amorphous, semi crystalline, or crystalline polymers.

Polymers having low shear viscosities and temperatures can be used. Also, the novel process may be advantageously used where a very thin film is desired that requires an interdiffusional chemical transfer that takes place throughout the entire thickness of the film. Also, the novel process may be advantageously used where closely matched polymer viscosities is not possible. The process also enables manufacturing of a very thin polymer film where only slight diffusion of small molecules into the film layer is desired, such as would be necessary for an interfacial polymerization.

Chemically cross-linked films may be made by the novel process since the resins are not brought into contact with each other until just prior to the extrusion, and thus they do not react, interdiffusion of the reactants and catalysts under optimized conditions, and the desired cross linking or chemical reaction can take place. Since much of this reaction happens in the melt curtain, after the constriction in the die, the normal pressure build up and melt fracture problems are avoided, and a well made cross linked film results.

In the novel process, an "interlayer" may be used to help delamination process, allowing "sticky" polymers to be effectively used in the process.

BRIEF DESCRIPTION OF THE DRAWINGS

The invention will be described by reference to the specification and the drawings, in which like numerals refer to like elements, and wherein.

Figure 1:
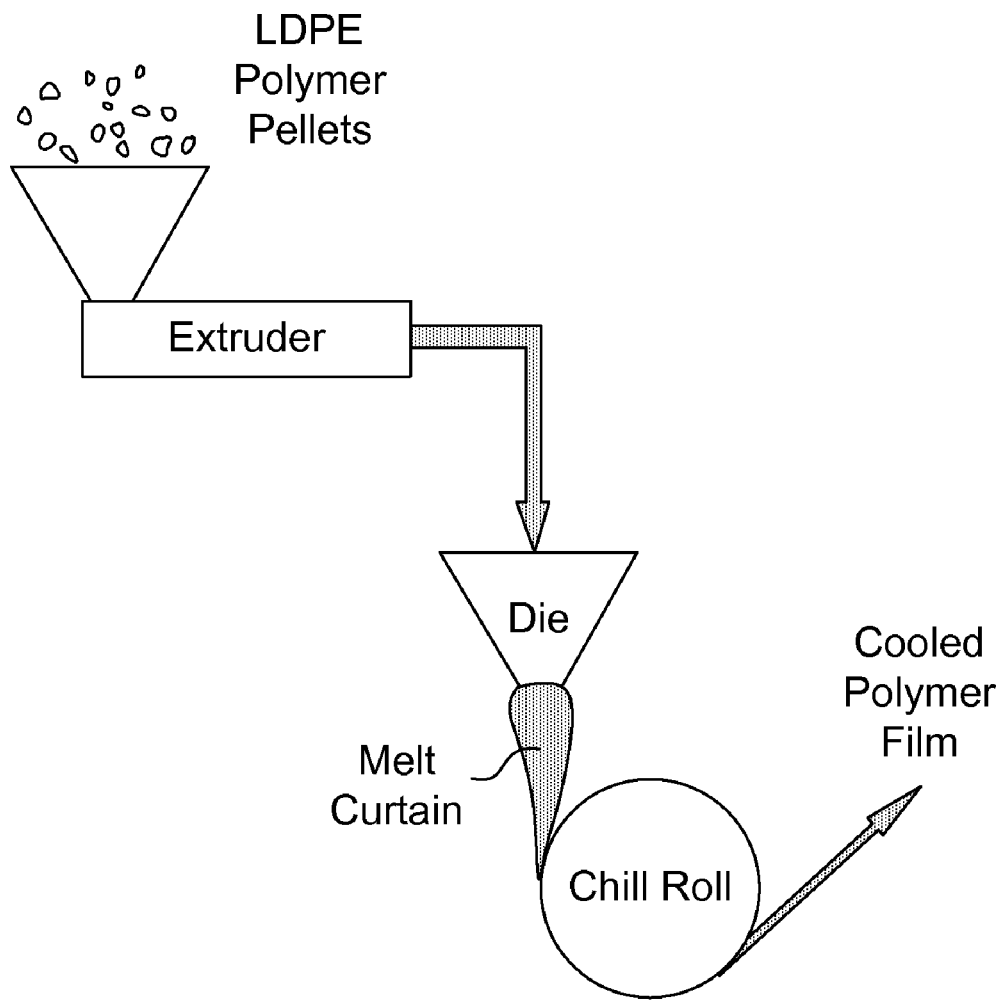
FIG. 1 is a depiction of the prior art cast film process.
Figure 2:
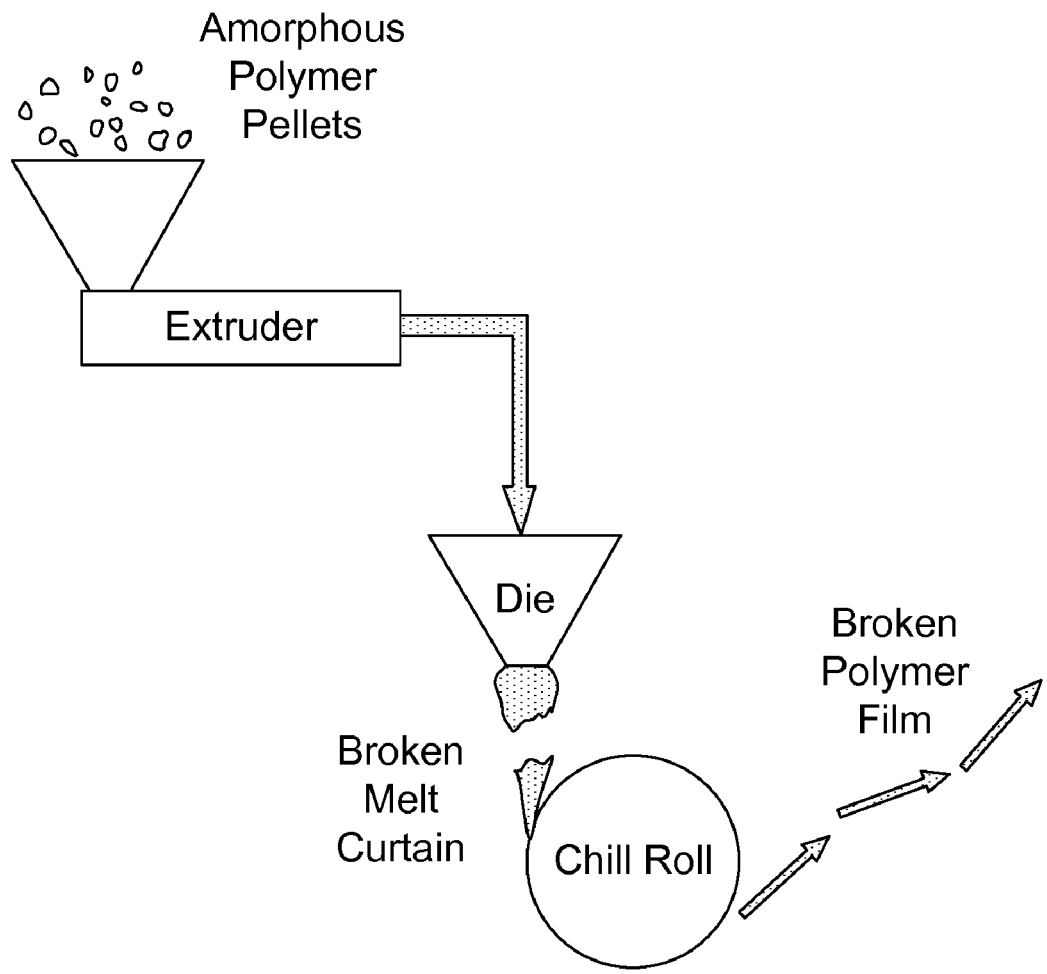
FIG. 2 is a depiction of the prior art cast film process where the melt curtain has broken.

The drawings are not to scale, in fact, some aspects have been emphasized for a better illustration and understanding of the written description.

PARTS LIST 100, 100A, 100B, and 100C assist layers prior to extrusion
102, 102A, and 102B film layers prior to extrusion
104 first extruder
106 second extruder
108 planar coextrusion die
110, 111, 112 assist layer after extrusion and prior to die
114, 115 film layer after extrusion and prior to die
117 planar coextrusion die lip
119 multilayer film stream
116 multilayer melt curtain
118 chill apparatus (e.g. chill roll)
120 delamination
121 web
122 assist layer after delamination
124 assist layer after delamination
126 film layer after delamination
128 transportation of very thin film to downstream operations
130A, 130B idle roll

DEFINITIONS

As used in this specification, melt curtain means the span of molten plastic between the die lip and the chill roll. The melt curtain is unsupported, and only the melt strength keeps the melt curtain from breaking.

As used in this specification, delaminate means a bulk separation of the film from the assist layer or the interlayer.

As used in this specification, amorphous polymer means any polymer that has a degree of crystallization of less than 5% as measured by differential scanning calorimetry.

As used in this specification, substantially uniform thickness means that the maximum deviation in thickness is less than 2%.

As used in this specification, draw resonance refers to a periodic perturbation in melt curtain width and thickness. If the draw resonance is severe, the melt curtain will break.

As used in this specification, molten refers to the state at which the polymer behaves as a viscous liquid.

As used in this specification, diffused means the mass transfer of small molecules from the assist layer or the interlayer into the film layer by means of a concentration gradient.

As used in this specification, chemical addenda means any addition of small molecules not originally included in the polymer.

As used in this specification, intimately contacting means thermal and physical contact allowing the transfer of small molecules and thermal energy, as well as physical support between melt flows.

As used in this specification, chemically reacted thermoplastic polymer means graft copolymerization, condensation, or cross linking.

As used in this specification, diffusible means a molecule having an average molecular weight of less than 5000.

As used in this specification, cross linked thermoplastic polymer means the reaction of adjacent polymers such that there is a 3 dimensional physical connection which increases the strength of the polymer and decreases its solubility.

As used in this specification, thermoplastic polymer with diffused chemical addenda means polymers which have experienced the addition of small chemicals through a mass transfer mechanism using a concentration gradient.

As used in this specification, thermoplastic polymer having at least one incompletely reacted monomer or oligimer means a polymer with chemical addenda which have the possibility of polymerizing.

As used in this specification, semi crystalline polymer means a polymer with degree of crystallization between 5 and 70% as determined by differential scanning calorimetry.

As used in this specification, crystalline polymer means a polymer with degree of crystallization greater than 70% as determined by differential scanning calorimetry.

As used in this specification, immiscible material filler means addenda to the polymer system which is not thermodynamically soluble.

As used in this specification, amphoteric heterocycle proton solvent refers to a cyclic molecule which can deliver a proton. This is useful in the electrochemical cycle of a fuel cell.

As used in this specification, stabilizer means any chemical which is added to decrease the degradation of a polymer, such as an antioxidant.

As used in this specification, cyclic olefin copolymers refer to polycyclic amorphous olefinic polymers such as polyethylene norbornene.

As used in this specification, plasticizer refers to a small molecule which shows some thermodynamic affinity for the polymer, decreasing the viscosity and the crystallinity.

As used in this specification, short chain fluorocarbon means any fluorocarbon with a weight average molecular weight less than 100,000, which has a low surface energy.

As used in this specification, low thermodynamic affinity means the two compounds will not substantially mix, allowing separate phases or microphases.

As used in this specification, basic molecule means any material which is a Lewis base.

As used in this specification, functional film layer means the freestanding product of our patent after the assist layer and interlayer are peeled off.

As used in this specification, adhesive layer means a layer which adheres adjacent layers. Adhesive layers such as polyvinyl acrylate are commonly known in the art.

As used in this specification, oxygen barrier layer means any barrier which decreases the velocity of oxygen permeation by more than 10%.

As used in this specification, moisture barrier layer means any barrier which decreases the velocity of moisture permeation by more than 10%.

As used in this specification, compatibilizing layer means any layer that allows inter-diffusion of substantial portions of adjacent polymer layers.

As used in this specification, polyolefin elastomer means a copolymer made of ethylene and another alpha-olefin such as butene or octene, such as formed using a metallocene catalyst.

As used in this specification, metallocene catalyst technology means a catalyst used form making olefins using a compound with the general formula (C5H5) bound to a metal center in the oxidation state II.

As used in this specification, high molecular weight silicone means a polydimethyl siloxane with a weight average molecular weight higher than 10,000.

As used in this specification, slip agent means a substance such as mica, which allows two layers to slip laterally with respect to each other.

As used in this specification, release agent means any substance which lowers the surface energy of a film allowing it to delaminate from an adjacent film with destroying the physical integrity of either of the films.

As used in this specification, biaxially orienting means the pulling of a film in the machine and lateral direction effectively reducing the thickness of the film.

As used in this specification, idle roll means a non driven conveyance roll.

As used in this specification, circumference of the idle roll means outer surface of the idle roll which is in contact with the film.

As used in this specification, vicat softening point means the temperature at which the specimen is penetrated to a depth of 1 mm by a flat-ended needle with a 1 sq. mm circular or square cross-section.

As used in this specification, ABA or ACB structure means a multilayer film where an ABA consists of a film B surrounded on the top and bottom by a different film A. An ACB structure has a three films, with B on one side, C in the middle, and A on the other side.

As used in this specification, dielectric film means a non conducting substance useful especially to increase the capacitance of capacitors.

As used in this specification, protective film means any film which shields the material below it from physical, chemical, or radiation damage.

As used in this specification, optics film means any film used for changing any of a number of optical properties of the substance below it such as refractive index or optical dispersion.

As used in this specification, conductive film means any film which has a conductivity greater than 10E-10 S/m.

As used in this specification, highly pigmented film means any film with a transmittance less than 0.95.

As used in this specification, film filled with reinforcing fillers means a film where the toughness or modulus of elasticity of the film has been increased by incorporating fillers such as glass fibers or silica.

As used in this specification, shear rate is defined as the ratio of the velocity to the distance of two parallel faces experiencing shear.

As used in this specification, strain hardening thermoplastic means a thermoplastic polymer which shows a decrease in melt strength of less than 5% over the extension rate experienced by the polymer in the melt curtain.

As used in this specification, hindered amine light stabilizer refers to a variety of commercially available light stabilizers which capture free radicals, but are regenerated, and thus are not significantly depleted over time.

As used in this specification, epoxy film means any film made from a thermosetting epoxide polymer. Epoxies can include polyurethanes, phenolics, and unsaturated polyesters. It is a product of bisphenol A and epichlorohydrin.

As used in this specification, insoluble film means a film which does not substantially soften in the application solvents.

As used in this specification, durable film means any film which is self supporting and has a tensile strength greater than 50,000 Pascals.

As used in this specification, modified polyvinyl alcohol film refers to a polyvinyl alcohol film which has been cross linked to avoid dissolution in an ethanol/water environment.

As used in this specification the term "freestanding" means a self supporting film wherein the film can be conveyed and handled without the use of a supporting medium. As used in this specification, freestanding does not refer to a film coated onto another substrate such as occurs during vapor deposition unless that film can be peeled off the substrate and handled separately.

As used in this specification, "very thin" means films less than or equal to 10 um.

As used in this specification, a thermoplastic polymer with high filler content means a filler percent greater than 20% as calculated by the formula: filler percent=mass filler/(mass filler+mass polymer).

As used in this specification, chemically reacted thermoplastic polymer means a polymer formed by a chemical reaction such as graft polymerization and condensation polymerization.

As used in this specification, semi crystalline polymer means a polymer greater than 5%, and less than 70%, crystals as defined by DSC.

As used in this specification, crystalline polymer means a polymer having greater than 70% crystals as defined by DSC.

As used in this specification, immiscible material filler means a solid unmeltable material.

DETAILED DESCRIPTION OF THE INVENTION

In accordance with this invention, there is disclosed a novel process comprising the steps of supplying a molten film layer stream and a molten assist layer stream by a first extruder and a second extruder; intimately contacting the film layer stream and the assist layer stream in coplanar fashion; extruding the film layer stream and at least one assist layer stream through a planar coextrusion die lip; stretching the multilayer melt curtain; cooling the multilayer film; delaminating the at least one assist layer from the film layer; and transporting the film layer to downstream processing operations. The novel process according to the present invention comprises a significantly modified cast film process. This novel process may be used to manufacture very thin freestanding films made from amorphous thermoplastic polymers, very thin highly filled films from any thermoplastic polymer, very thin chemically reacted or cross linked films made from any thermoplastic polymer and appropriate cross linkers or hardeners, and very thin freestanding films made from any polymer with diffusible chemical addenda which would otherwise thoroughly react with the film in an undesirable way at extrusion temperatures. In one embodiment, a very thin free standing film further comprises one or more functional films such as an adhesive layer or a barrier layer, or another film.

Figure 3:
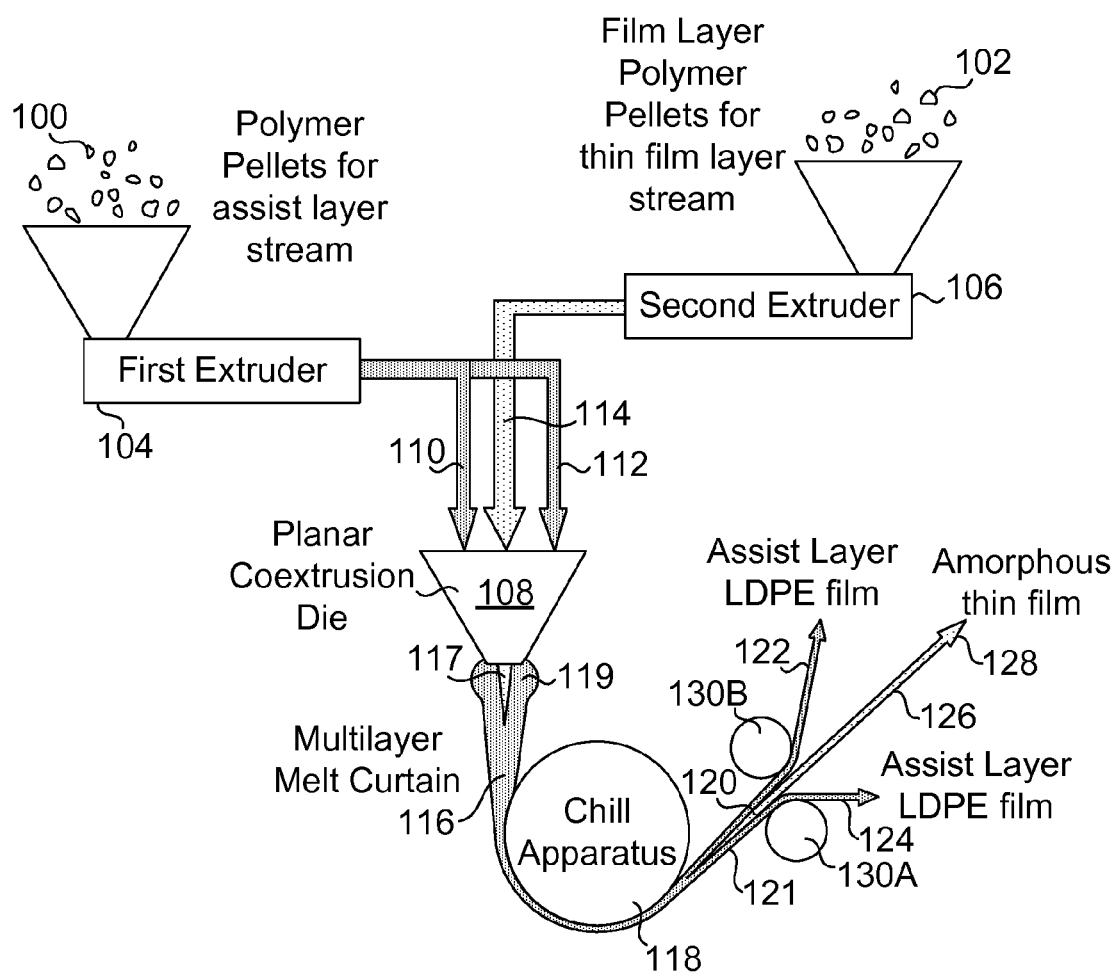
FIG. 3 is a depiction of a novel process for manufacturing very thin free standing polymeric film.
Figure 4:
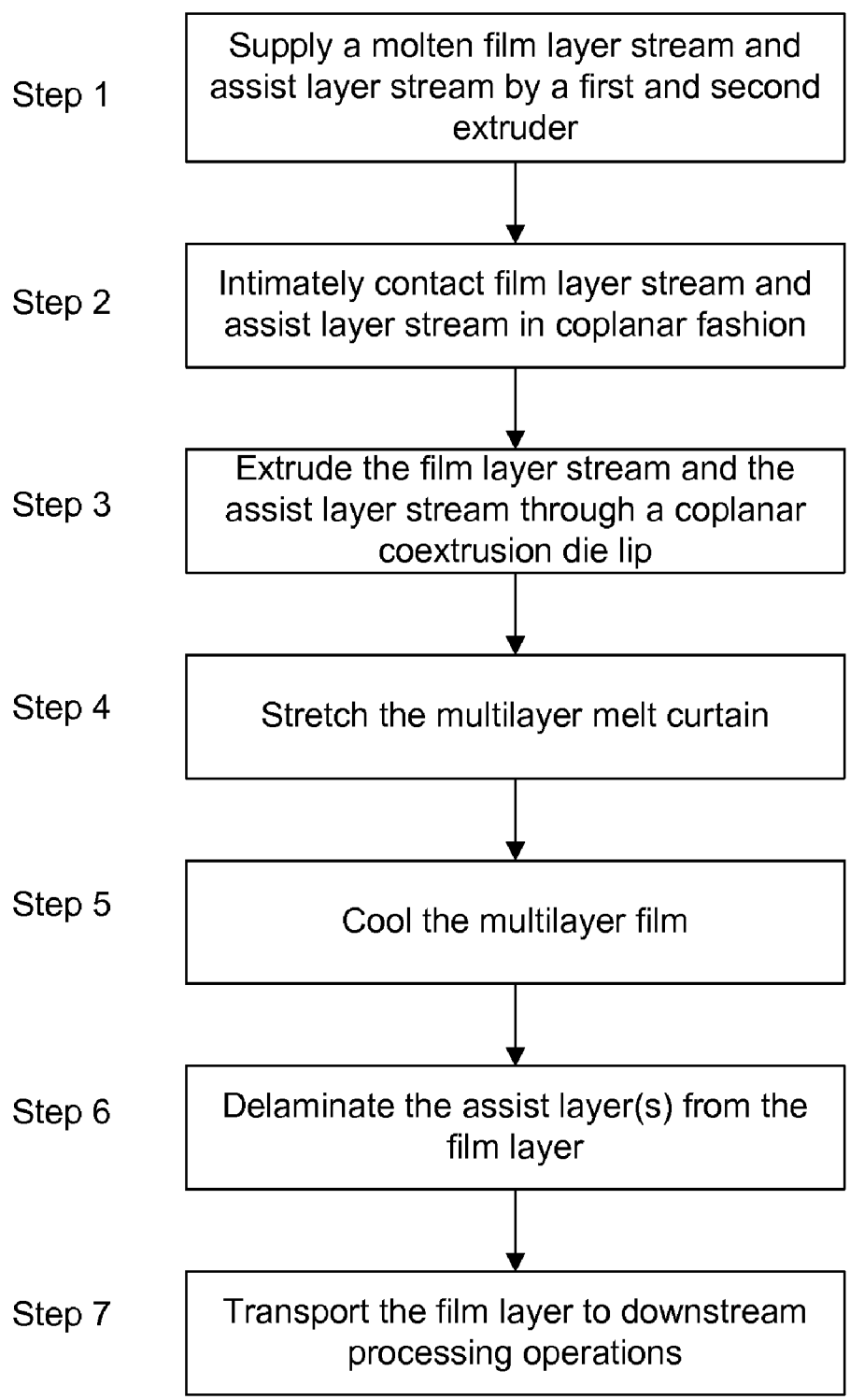
FIG. 4 is a schematic diagram depicting the steps of the novel process.

FIG. 3 depicts the novel process for manufacturing very thin free standing thermoplastic polymeric films. This novel process generally comprises seven steps. FIG. 4 is a schematic diagram depicting the steps of the process.

Referring to FIG. 3 and FIG. 4 and Step 1 thereof, a molten "assist" layer stream 100 and a molten "film" layer stream 114 are supplied by a first and second extruder respectively. The thermoplastic polymers 110, 114 from these respective layers are conventionally melted from polymer pellets on a single or twin screw extruder 104, 106; however, other extruder devices and configurations may be suitably adapted and are considered within the scope of the present invention. The type and configuration of the extruder screw and the extruder temperature varies with the polymer 110, 114 being extruded, however the specifications of the appropriate screw design are often published by the polymer supplier.

Preferably, the relative temperatures of the film 114 and the assist 110 layer are less than about 50 degrees Celsius from one another, and most preferably the relative temperatures of the film 114 and the assist 110 layer are less than about 5 degrees Celsius from one another.

Preferably, the relative viscosities of the two layers 110, 114 are close, most preferably within a 10× ratio at a 1 sec-1 shear rate at the operational extrusion temperature. One way to measure these viscosities is to use an Ares-G2 rheometer from TA Instruments.

In one embodiment, the film layer stream 114 comprises at least one melted amorphous, crystalline or semi-crystalline polymer stream selected from the group consisting of an amorphous polymer, a thermoplastic polymer with high filler content, a thermoplastic polymer and one or more incompletely reacted monomers or oligimers, and combinations thereof. In one embodiment, at least two melted thermoplastic streams are supplied. In one embodiment, three or more melted thermoplastic streams are supplied. It is also understood that the film layer 114 may comprise a plurality of layers wherein the sum of the individual layer thicknesses still constitute a very thin film, and that the plurality of films cannot be extruded without the help of the assist layer 110. Additional layers may consist of tie layers, oxygen or moisture barriers, compatibilizing layers, or any of a myriad of functional layers for future operations.

In a preferred embodiment, an amorphous polymer comprises a polymer such as polycarbonate, polymethyl methacrylate, polysulfone, and the like. In a preferred embodiment, a thermoplastic polymer with high (equal to or greater than 20%) filler content comprises any immiscible material such as, for example, silica, barium sulfate, titanium dioxide, carbon black, carbon nanotubes, cross-linked polymer or calcium carbonate.

Figure 5:
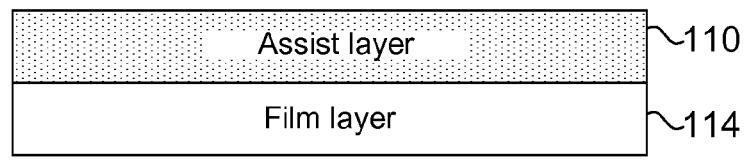
FIG. 5 is a schematic diagram depicting a novel very thin film thermoplastic film layer and one assist layer.

In one embodiment, the assist layer stream 110, 112 comprises at least one melted thermoplastic polymer stream selected from the group consisting of a strain hardening thermoplastic such as LDPE (low density polyethylene) or branched polymer, a strain hardening thermoplastic and monomers/oligimers and/or catalyst necessary to complete the desired reaction from the film layer stream 114 as well as other addenda which can be diffused into the film layer 114 such as plasticizers, dyes, or cationic or anionic species. The assist layer 110, 112 may also have antioxidants or other stabilizers present in the assist layer to decrease the degradation and allow better recycling. Optionally and additionally, additives such as silicone, talc, or other release agents may be added to the assist layer to facilitate delamination. FIG. 5 is a schematic diagram depicting a novel very thin film thermoplastic film layer 114 and one assist layer 110.

In another embodiment, the assist layer 100 comprises any polymer which is used for biaxial orientation, such as polyethylene terephthalate, polypropylene, or nylon. These materials are preferably used as assist layers 100 when it is desired to biaxially orient the polymer film.

Figure 6:
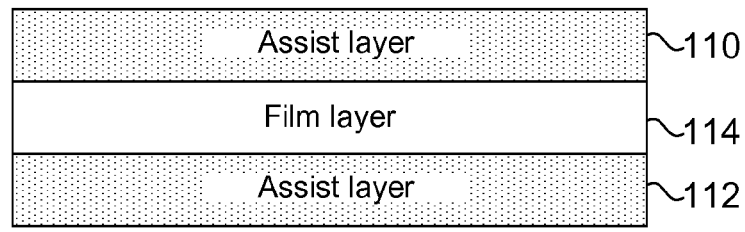
FIG. 6 is a schematic diagram depicting a very thin film thermoplastic film layer and two assist layers.

In some embodiments, two assist layer streams 100A, 100B are provided. In such embodiments, the film layer stream 102 is preferably disposed between the respective assist layer streams 100A, 100B. FIG. 6 is a schematic diagram depicting a very thin film thermoplastic film layer 114 and two assist layers 110, 112.

Figure 7:
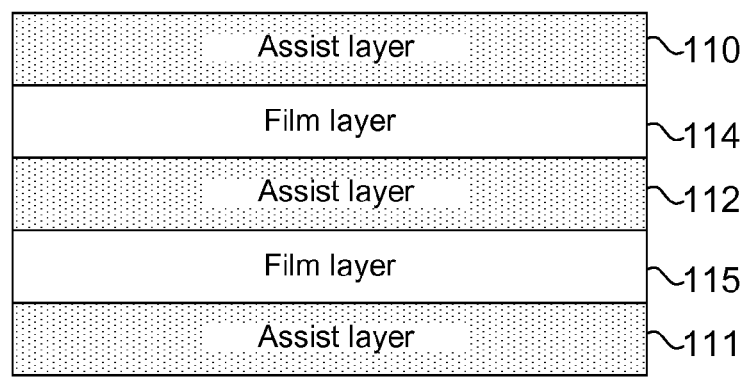
FIG. 7 is a schematic diagram depicting two very thin thermoplastic polymeric film layers and three assist layers.

As will appreciated, this process may be used to form any number of coplanar layers of film and assist, and even include additional interlayers as necessary or desired to facilitate delamination. In some embodiments, three or more assist layer streams 100A, 100B, 100C (not depicted) are provided, some disposed internally, and some disposed externally. In this aspect where three assist layer streams 100A, 100B, 100C are extruded, the coextruded product is a 5 layer structure consisting of assist/film/assist/film/assist. FIG. 7 is a schematic diagram depicting two very thin thermoplastic polymeric film layers 114, 115 and three assist layers 110, 111, 112.

Referring to FIG. 3 and FIG. 4 and Step 2 thereof, the film layer stream 114 and the assist layer stream 110, 112 are combined in such a way that the streams 110, 112, 114 are in intimate contact, not mixed, and coplanar as they are extruded at the coplanar extrusion die 108. Preferably, the assist layer 110, 112 is disposed on the outside of the structure to facilitate later delamination. The assist layer 110, 112 may be disposed on one or both sides of the film layer 114. FIG. 3 depicts the film layer 114 extruded between two assist layers 110, 112. By way of example, but not limitation, Step 2 is performed in one embodiment with a coextrusion feed block from Cloeren Inc. or Davis Standard LLC, or a multimanifold die from Extrusion Die Industries LLC.

The film and assist layers can be joined in several ways which are readily apparent to those skilled in the art. In one aspect of this process, the layers are joined together in a coextrusion feed block. Basically, the molten polymers are combined from their cylindrical extruders and pipes into very thick coplanar rectangular molten slabs which flow into the planar coextrusion die 108, which then distributes the polymer layers into very thin films via its coextrusion die lip. The advantage of the coextrusion feed block is that it is relatively inexpensive and versatile. The disadvantage is that the resins are in contact for a long period of time, allowing the polymers of lower viscosity to displace the high viscosity polymers at the edges resulting in a redistribution of low viscosity polymer to the edges, and high viscosity polymer to the middle. In addition, use of a coextrusion feed block cannot support high temperature differences between the layers, since the long contact time between the layers causes them to reach a temperature equilibrium through interlayer thermal conduction. If the film and assist layers are of similar viscosities and temperatures, however, this is not a problem and a coextrusion feed block is adequate.

In some aspects of the process, a multimanifold planar coextrusion die 108 is used. A multimanifold die combines the functionality of a coextrusion feed block with a coextrusion die 108. Each layer is separately shaped into a film, and then the various films are brought into contact at the last second. The multilayer film stream 116 exits via the multimanifold's planar coextrusion die lip 117. The advantage of this technique is that the individual layers can be different temperatures and viscosities. Preferably, the temperature difference is less than 70 degrees Celsius. Preferably, the viscosity difference is less than 20× at 1 sec-1 shear rate at the optimal extrusion temperature. The viscosity differences can be measured for example, by an Ares-G2 rheometer from TA Instruments. Because the melt streams are brought into contact very late in the process, there is very little time for them to interact. The disadvantage is that the die 108 must be designed for polymers of a very specific viscosity range, and if the polymer changes, a new die system must be purchased. In addition, a multimanifold die is more expensive and takes more space.

In a preferred embodiment of the present invention, a coextrusion feed block is used when there is a match between the low shear viscosities and temperatures of the film 114 and the assist layer 110, 112, or if the very thin film desired comprises an interdiffusional chemical transfer between the assist layer 110 and the film layer 114 to take place throughout the entire thickness of the film 114.

In contrast, a multimanifold die 108 is preferable when it is not possible to closely match the viscosities of the assist layer 110 and the film layer 114, or if only slight diffusion of small molecules from the assist layer 110 into the film layer 114 is desired, such as would be necessary for an interfacial polymerization.

Referring to FIG. 3 and FIG. 4 and Step 3 thereof, the film layer stream 114 and the assist layer stream 110, 112 are extruded through a planar coextrusion die lip 117. The combined layers are preferably passed through a standard rectangular sheet or film die, in a conventional manner, yielding a melt curtain 116 consisting of the film layer 114 and the assist layer 110, 112.

When the film layer or layers and the assist layer are extruded through the die lips 117, design consideration must be made to keep the pressure drops reasonable. Normally, extrusion equipment is designed to operate at less than 500,000 Pascals. The die gap and the land length of the die lip 117 must be sized to operate below this pressure, or whatever the maximum pressure of the equipment is designed to be. Normally, the pressure drop across the die lip 117 is proportional to the 2-3 power of the die gap, and linearly proportional to the die lip 117 length (normally referred to as the land length). In order to minimize pressure drop therefore, it is advantageous to maximize the die gap. However when the die gap is increased, the drawdown ratio is increased, making it more likely that the melt curtain 116 will break. There is therefore an optimum die gap for the system of interest. This also has an economic impact to the system. The smaller the die gap, the less the drawdown, and the lower volume of assist layer 110, 112 that is required. If the assist layer 110 is used on only one side, then pressure drop will be determined by both the assist layer 110 and the layer adjacent to the other side of the die. If the assist layer is on both the top 110 and bottom 112 sides of the die, then the pressure drop is determined almost exclusively by the pressure drop of the assist layer 110, 112. This is a great advantage when extruding high viscosity Newtonian fluids, or high viscosity filled materials, since the shear rate at the die lips 117 is very high, and the assist layer 110, 112 is inherently shear thinning. Other viscosity reducing materials such as slip agents can be added to the assist layer 110, 112, as is well known to those in the art.

Referring to FIG. 3 and FIG. 4 and Step 4 thereof, the multilayer melt curtain 116 is stretched while still in the molten state, significantly reducing its thickness. During this draw down phase, the melt curtain 116 would normally break. However since it is coextruded with a sufficient supporting assist layer 110, 112, it does not. When the melt curtain 116 consists of an amorphous thermoplastic or a highly filled thermoplastic, the assist layer 110, 112 functions as a mechanical support layer which keeps the melt curtain 116 from breaking during the drawdown phase of the process.

The extruded melt curtain 116 is "drawn down" after it leaves the die lip 117. A typical die 108 gap will be 600 μm thick. If the desired thickness of the film 126+assist layer 122, 124 is, for example, 10 μm, then the drawdown ratio is 60. The higher the drawdown ratio, the more likely it is that the melt curtain 116 will break. This is why it is not advisable to increase the die gap beyond a certain limit. The drawdown ratio for amorphous polymers, or polymer systems with poor melt strength is often <10. The drawdown ratio for layer assist materials such as LDPE is often >50. Therefore, the drawdown ratio for the combination of layers would be >10. The presence of the assist layer 122, 124 allows for much higher drawdown ratios than would otherwise be possible and therefore much thinner films 126. This drawdown is accomplished by having the cooling apparatus 118 (chill rolls, chill calendar nip, air impingement device, etc) running at a higher velocity than the polymer 116 is coming out of the die 108.

When a cross linked polymer layer is desired, the film layer and the assist layer are supplied with separate monomers or oligomers which, when combined, react. However before the resins are brought into contact with each other, they do not react. When the film and assist layer are in intimate contact at extrusion temperatures, interdiffusion of the reactants and catalysts occur, and the desired cross linking or chemical reaction can take place. Since much of this reaction happens in the melt curtain 116, after the constriction in the die 108, the normal pressure build up and melt fracture problems are avoided, and a well made cross linked film results.

Referring to FIG. 3 and FIG. 4 and Step 5 thereof, the multilayer film is cooled to the temperature necessary for separation. The means of cooling 118 are not critical and any means known in the art may be adapted to the present invention. Nevertheless, there are advantages gained by combining the cooling with calendaring by means of using one or more pressurized nips. This technique has been widely used and is illustrated in U.S. Pat. No. 3,756,760 and others. The entire disclosure of said patent is incorporated herein in its entirety for its teachings.

The advantage of using the pressurized nip is a reduction in the variability of the thickness. It should be pointed out that the assist layer 122, 124 facilitates the calendaring process, since the assist layers 122, 124 retain heat, causing the film layer 126 to be warmer during the calendaring process than it would otherwise be without the assist layer 122, 124. The higher temperature during calendaring will result in a substantially more uniform thickness and less residual stress in the film layer 126. Also, systematic cross-direction variability in the thickness can be selectively "ironed out" by the use of a nipco calendar which allows selective application of different pressures in different zones of the web 121, further improving the thickness uniformity of the web 121 made by the process according to the present invention.

By way of illustration, but not limitation, the cooling step is performed by a cooling apparatus 118 such as a plurality of cooled rolls, but many other cooling techniques are available and well known to those skilled in the art.

In one aspect of this embodiment, after cooling, the resultant web 121 can be biaxially oriented to further reduce the thickness of the film layer 126. In this instance, the assist layer must be comprised of a biaxially orientable polymer, such as polyethylene terephthalate, polypropylene, or nylon.

The more material required for the assist layer 122, 124, the greater the cooling demand will be. This may limit the process speed, since the assist layer/film layer interface must be cold enough to allow a reasonable delamination 120 to occur. The interlayer temperatures should be preferentially cooled below the vicat softening point of each polymer system of the film 126 and assist layer 122, 124. When the assist/film layers have been adequately cooled, the assist layers 122, 124 can be delaminated 120 from the film layer 126.

Referring to FIG. 3 and FIG. 4 and Step 6 thereof, the assist layer or layers 122, 124 are delaminated from the film layer 126. The means of delaminating 120 are not critical and any means know in the art may be adapted to the present invention. By way of illustration, but not limitation, the delaminating 120 step is performed by passing the combined structure over an idle roll, 130A, 130B and while the structure is still on the idle roll 130A, 130B, delaminating 120 one of the assist layers 122, 124 off the film 126. It is desirable to have the delamination 120 occur on the circumference of the idle roll 130A, 130B, since delamination 120 on a free span of web 121 would occur in unpredictable places and may cause web breaks. After delamination 120, the assist layer 122, 124 can be wound up in roll form, or roped and/or chopped. The assist layer 122, 124 is recycled, discarded, or sold. The film layer 126 passes to the next step of the process.

Referring to FIG. 4 and Step 7 thereof, the film layer is transported 128 to downstream processing operations, including for example, coating, printing, winding, thermal annealing, packaging, and the like.

The relative temperatures of the film 114 and the assist layer 110, 112 should be close, and the relative viscosities of the two layers 110, 112, 114 should also be close. The reason for this is that, unlike the blown film coextrusions described in U.S. Pat. No. 3,337,665, U.S. Pat. No. 3,880,691, and U.S. Pat. No. 4,379,117, the cast film extrusions described here have two additional constraints due to planar extrusion as opposed to extrusion with cylindrical symmetry: (1) edge encapsulation, and (2) draw resonance.

In a coextruded cast film process, edge encapsulation occurs when there is a large (low shear) viscosity mismatch between the two materials being coextruded. When the two layers have been combined at the coextrusion feed block, energy considerations dictate that the lowest viscosity polymer migrate to the pipe walls and die walls, leaving the higher viscosity material with as little contact with the wall as possible. This results in the lowest energy state of the system. Since material being extruded at the very edge of the flat die is in contact with the die wall for a long time, this migration of the lower viscosity material to the die wall can occur to a great extent, which will result in a relatively greater proportion of the low viscosity material at the edge than is present in the middle. This will result in an extrusion which has too much low viscosity material at the edges and too much high viscosity material in the center. Thus, the viscosities need to be controlled to within an order of magnitude (10×) at low shear rates to avoid this phenomenon. Edge encapsulation becomes more acute as the machine width increases (this is because the contact time at the edges is longer).

Fortunately, a great variety of materials appropriate for the assist layer 110, 112 are commercially available. For instance, if the film layer 114 has a low shear viscosity of 3000 poise at 250 Celsius, then a low density polyethylene (LDPE) can be used as an assist layer 110, 112 that has a similar viscosity at this temperature and shear rate. Similarly, if a film layer 114 has a low shear viscosity of 1500 poise at 250 Celsius, then a different grade of low density polyethylene (LDPE) can be used as the assist layer 110, 112. Also, mixtures of commercially available LDPEs of different viscosities can be made which can "mix and match" the low shear viscosity of the film layer 114.

Also, unlike the blown film processes, additional edge effects must be considered in a cast film process. One common edge problem is called "draw resonance", and is a problem frequently exhibited by a high speed cast film process. Linear polymers such as polymethyl methacrylate and polysulfones cannot be extruded at high speed in a cast film process because they exhibit draw resonance. The edges of the film oscillate in a roughly sinusoidal manner, which causes irregularities (e.g. non-uniformities) in the width and thickness, resulting in an eventual break of the melt curtain 116. Polymers like PMMA have draw resonance problems because they do not exhibit a strain hardening regime in the melt. In contrast, polymers like LDPE (especially LDPE made in an autoclave process) have excellent strain hardening characteristics, and very little problem with draw resonance. For this reason, and because of its relatively low cost and good recyclability, LDPE is preferably used for the assist layer 122, 124. However, any branched material such as ethylene vinyl alcohol or a branched polyester can be used.

Under some conditions, the delamination 120 step is difficult because of adhesion between the assist layer 122, 124 and the film layer 126. This can be solved using several techniques in step 1. One technique is to reduce the length and frequency of the long chain branching, or overall molecular weight of the branched polymer in the assist layer. This reduces the interpenetration of the two layers. For example, a mixture of LDPE and low molecular weight HDPE can be used to accomplish this in a way that permits easy delamination without inducing draw resonance. In addition, a high molecular weight release agent such as Dow MB50-002 high molecular weight silicone dispersed in polyethylene could be added to the assist layer. Talc is also an option.

Figure 8:
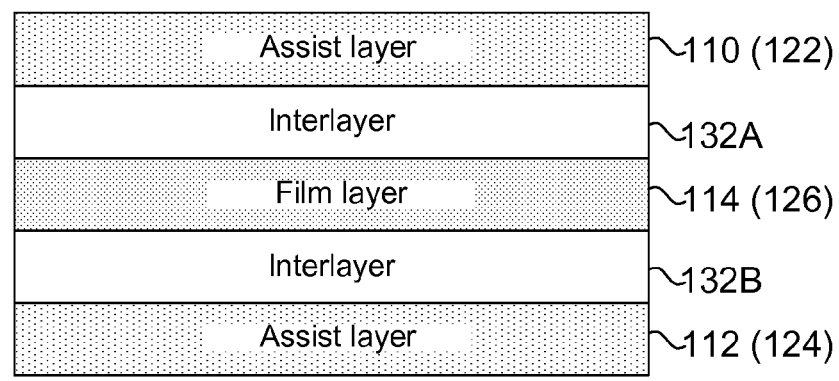
FIG. 8 is a schematic diagram depicting a very thin film thermoplastic film layer, two interlayers and two assist layers.

The release requirement between the film layer 126 and the assist layer 122 124 makes it difficult to use "tacky" polymers like metallocene catalyzed polyolefin elastomers as the assist layer 122, 124 polymer. In extreme cases, an "interlayer" may be required, which helps in the release between the assist layer 122, 124 and the film layer 126. This interlayer may or may not assist in the drawdown of the film layer. An example of an interlayer could be a short chain fluorocarbon with low thermodynamic affinity for the film layer, or any layer that would have a low entropy of mixing with the film layer. Often, this layer would necessarily exhibit poor melt strength, and additional assist layer may be required to convey both the film layer and the interlayer. FIG. 8 depicts the use of an interlayer 132A, 132B between assist layers 110 (also 122), 112 (also 124) and film layer 114 (also 126).

When it is desired that the final film 126 be cross linked, an epoxy prepolymer consisting of bisphenol A can be mixed with the thermoplastic film material 102, and a hardener (for example an epichlorohydrin) can be added to the assist layer 100. When these thermoplastic molten layers 110/112, 114 are brought into contact, interdiffusion occurs, and the exothermic polymerization reaction takes place outside of the die 108, reducing the pressure drop and melt fracture. If the reaction is desired to take place throughout the film 114, then the preferred method of combining the film layer 114 and the assist layer 110, 112 (step 2) would be the use of a coextrusion feed block. Since a coextrusion feed block brings the materials into contact many seconds before the actual extrusion takes place, diffusion of the reactants can occur throughout the thickness of the film 114. However, if only interfacial polymerization is desired, a multimanifold die 108 may be preferred, since this would allow only tenths of seconds of reaction time, resulting only in a local surface treatment of the film 114.

In addition to a chemical reaction, it may also be advantageous to have small molecules simply diffuse from the assist layer 110, 112 to the film layer 114. An example of this might be the use of hindered amine light stabilizers (HALS) in polycarbonate films. Since polycarbonate is slightly acidic, and a hindered amine light stabilizer is a base, the two materials react in an acid/base fashion, destroying the radical scavenging functionality of the hindered amine. If, however the HALS is added only at the last second, by diffusion through the assist layer 110, 112 in a multimanifold die 108, the acid/base reaction can be considerably reduced, and greater light stability can be attained. In addition, a plasticizer which may react with the film layer 114 at high temperatures can be added instead to the assist layer 110, 112, and the plasticizer can be allowed to diffuse into the film layer 114 where it will react for a much shorter time period, which may not deleteriously affect the system.

A Novel Very Thin Self Supporting Thermoplastic Polymer Film

There is further disclosed a very thin self supporting amorphous, crystalline or semicrystalline polymer film having a thickness of less than about 10 μm, wherein the amorphous, crystalline or semicrystalline polymer film comprises a film selected from the group consisting of an amorphous thermoplastic polymer, a highly filled thermoplastic polymer, a chemically reacted thermoplastic polymer, a cross linked thermoplastic polymer, and a thermoplastic polymer with diffusible chemical addenda.

In one embodiment, the amorphous polymer comprises a polymer selected from the group consisting of polycarbonate, polymethyl methacrylate, and polysulfone.

In one embodiment, the highly filled thermoplastic polymer comprises a thermoplastic polymer selected from the group consisting of polycarbonate, polymethyl methacrylate, and polysulfone, and an immiscible material selected from the group consisting of silica, barium sulfate, titanium dioxide, carbon black, carbon nanotubes, cross-linked polymer, calcium carbonate, and combinations thereof.

In one embodiment, the chemically reacted thermoplastic polymer comprises a sulfonated polyetherimide or polysulfone sulfonated by diffused trimethylsilylchlorosulfonate.

In one embodiment, the cross linked thermoplastic polymer comprises polyvinyl alcohol, ethylene glycol plasticizer, phosphoric acid stabilizer, and diffused gluteraldehyde which reacts with the polyvinyl alcohol to form a web with increased stiffness.

In one embodiment, the diffused chemical addenda comprises a sulfonated polymer from the group consisting of sulfonated bisphenol A polyetherimide, sulfonated poly(arylene ether sulfone), and polyperfluorosulfonic acid with diffused amphoteric heterocycle proton solvents. Preferably, the diffused amphoteric heterocycle proton solvent comprises 1H-1, 2, 4 triazole.

In one embodiment, the film layer has two different chemical addenda, one diffused on a first side of the film layer and one diffused on a second side of the film layer (e.g. top and bottom sides of the film). In one aspect, the diffused chemical addenda on the first side comprises an acidic polymer selected from the group consisting of a sulfonated polyetherimide, a sulfonated polysulfone, and a sulfonated polyfluoroetherimide. On the second side is diffused a basic molecule such as a quaternary ammonium salt. Thus, the product is a very thin free standing thermoplastic polymeric film which is acidic on one side and basic on the other.

In one embodiment, the thermoplastic polymer film further comprises one or more functional films selected from the group consisting of an adhesive layer, an oxygen barrier layer, a moisture barrier layer, and a thermoplastic polymer film layer.

In one embodiment, the adhesive layer comprises a compound selected from the group consisting of ethylene vinyl acetate, poly(ethylene methyl acrylic acid), maleic anhydride grafted polypropylene, and a polyolefin elastomer produced from the metallocene catalyst technology.

In one embodiment, the oxygen layer comprises poly(ethylene vinyl alcohol) or nylon 6 or nylon 66.

In one embodiment, the moisture barrier comprises high density polyethylene, polypropylene or a polyethylene/polypropylene copolymer.

A Novel Very Thin Film-Laminate Substrate (Intermediate Product)

As will be appreciated by those skilled in the art, the assist layers have extremely low adhesion characteristics, allowing for the delamination process. The use of one or more assist layers allows for manufacturing of certain types of thermoplastic polymer films and membranes which normally cannot support themselves using classic coating or extrusion methods. This novel curtain coating cast film process also allows for manufacturing of very thin thermoplastic polymer films that are substantially uniform and have uniformly dispersed fillers. These very thin self supporting polymer films have been previously unknown in the art. Thus, there is further disclosed a very thin film-laminate substrate comprising a thermoplastic polymer film layer in contacting engagement with at least one assist layer, the thermoplastic polymer film layer having a thickness of less than about 10 um, and being self supporting, wherein the thermoplastic polymer film layer comprises a film selected from the group consisting of an amorphous thermoplastic polymer, a highly filled thermoplastic polymer, a chemically reacted thermoplastic polymer, a cross linked thermoplastic polymer, and a thermoplastic polymer with diffused chemical addenda.

In one embodiment, the thermoplastic polymer film further comprises one or more functional films selected from the group consisting of an adhesive layer, a barrier layer, a tie layer, an oxygen barrier layer, a moisture barrier layer, a compatibilizing layer, and a thermoplastic polymer film layer.

In one embodiment, the amorphous polymer comprises a polymer selected from the group consisting of polycarbonate, polymethyl methacrylate, and polysulfone.

In one embodiment, the highly filled thermoplastic polymer comprises a thermoplastic polymer selected from the group consisting of an amorphous polymer, a semi crystalline polymer, and a crystalline polymer. In one aspect, The amorphous polymer comprises atactic polystyrene, polyetherimide, polyimide, polyethersulfone, cyclic olefin copolymers or polyacetal. In one aspect, the semi crystalline polymer comprises polyethylene terephthalate. In one aspect, the crystalline polymer comprises nylon 6 or high density polyethylene.

In one embodiment, the highly filled thermoplastic polymer comprises an immiscible material selected from the group consisting of silica, barium sulfate, titanium dioxide, carbon black, carbon nanotubes, cross-linked polymer, calcium carbonate, and combinations thereof.

In one embodiment, the assist layer comprises a thermoplastic polymer selected from the group consisting of a strain hardening thermoplastic or any thermoplastic polymer specifically modified with long chain. In a preferred embodiment, the assist layer comprises LDPE (low density polyethylene). In one embodiment, the strain hardening thermoplastic comprises low density polyethylene, poly(ethylene methyl acrylate), or poly(ethylene methacrylic acid). In one aspect, the thermoplastic polymer specifically modified with long chain branching comprises specially modified long chain branched poly(butylene terephthalate).

In one embodiment, the assist layer further comprises addenda selected from the group consisting of a monomer, an oligomer, a catalyst, a free radical initiator from any of the peroxide family, a plasticizer, a dye, a cationic species, an anionic species, an acidic species, an antioxidant, a stabilizer, a UV absorbent, a high or low molecular weight silicone oil, talc, release agent, a hindered amine light stabilizer and combinations thereof. In one embodiment, the catalyst comprises titanium isopropoxide. In one embodiment, the plasticizer comprises ethylene glycol, dioctyl sebecate, or triphenyl phosphate. In one embodiment, the cationic species comprises a quaternary ammonium salt. In one embodiment, the antioxidant comprises a hindered phenol. In one embodiment, the stabilizer comprises phosphoric or phosphorous acid.

EXAMPLES

Example 1

A thin polycarbonate film was manufactured. The film is useful as a capacitor dielectric.

Polycarbonate pellets purchased from Mitsubishi were dried at 121 degrees Celsius for 12 hours. The polycarbonate pellets were fed into a 25 mm single screw extruder, with a melt temperature of 243 degrees Celsius. The screw on the extruder was a standard single screw with a Maddox mixer, and the screw speed was adjusted so as to obtain a rate of 22 g/min.

The assist layer was prepared using Na214 low density polyethylene (LDPE) purchased from Equistar corp. The LDPE was undried, and was fed into another 25 mm single screw extruder which was operated at melt temperature of 216 degrees Celsius. The screw on the extruder was a standard single screw with a Maddox mixer, and the screw speed was adjusted so as to get a rate of 45 g/min.

The two polymers were brought together in a standard coextrusion feedblock in an ABA structure, where A is the assist layer (low density polyethylene) and B is the molten polycarbonate. Thus, the molten polycarbonate was in the center, and the molten low density polyethylene was equally divided in the outer layers.

The 3 molten layers were then coextruded through a standard 20 cm coat hanger die with a die gap of 0.64 mm, and quenched on a chill roll operating at a temperature of 27 degrees Celsius, and running at a speed of 30.5 m/min.

The polyethylene was peeled off the polycarbonate, yielding a polycarbonate film which was 3 µm in thickness.

Example 2

Polycarbonate pellets purchased from Mitsubishi were dried at 121 degrees Celsius for 12 hours. The polycarbonate pellets were fed into a 25 mm single screw extruder, with a melt temperature of 243 degrees Celsius. The screw on the extruder was a standard single screw with a Maddox mixer, and the screw speed was adjusted so as to obtain a rate of 22 g/min.

The assist layer was prepared using Na214 low density polyethylene (LDPE) purchased from Equistar corp. The LDPE was undried, and was fed into another 25 mm single screw extruder which was operated at melt temperature of 216 degrees Celsius. The screw on the extruder was a standard single screw with a Maddox mixer, and the screw speed was adjusted so as to get a rate of 45 g/min.

The two polymers were brought together in a standard coextrusion feedblock in an ABA structure, where A is the assist layer (low density polyethylene) and B is the molten polycarbonate. Thus, the molten polycarbonate was in the center, and the molten low density polyethylene was equally divided in the outer layers.

The 3 molten layers were then coextruded through a standard 20 cm coat hanger die with a die gap of 0.64 mm, and quenched on a chill roll operating at a temperature of 27 degrees Celsius, and running at a speed of 36.6 m/min.

The LDPE polyethylene was peeled off the polycarbonate, yielding a polycarbonate film which was 2.5 µm in thickness.

Example 3

A thin acrylic film was made. The PMMA film is useful to enhance gloss of an injection molded device.

V044 polymethyl methacrylate (PMMA) purchased from Arkema Inc. was dried for 12 hours at 79 degrees Celsius. The PMMA pellets were fed into a 25 mm single screw extruder, with a melt temperature of 235 degrees Celsius. The screw on the extruder was a standard single screw with a Maddox mixer, and the screw speed was adjusted so as to obtain a rate of 23 g/min.

The assist layer was prepared using Na214 LDPE purchased from Equistar Corp. The LDPE was undried, and was fed into another 25 mm single screw extruder which was operated at melt temperature of 218 degrees Celsius. The screw on the extruder was a standard single screw with a Maddox mixer, and the screw speed was adjusted so as to get a rate of 45 g/min.

The two polymers were brought together in a standard coextrusion feedblock in an ABA structure, where A is the assist layer (LDPE) and B is the molten PMMA. Thus, the molten PMMA was in the center, and the molten LDPE was equally divided in the outer layers.

The 3 molten layers were then coextruded through a standard 20 cm coat hanger die with a die gap of 0.64 mm, and quenched on a chill roll operating at a temperature of 27 degrees Celsius, and running at a speed of 30.5 m/min.

The LDPE was peeled off the PMMA, yielding a PMMA film which was 3 µm thick. Occasional tearing of the PMMA was observed during the delamination operation which was expected since PMMA is fairly brittle.

Example 4

To assess the factors which could be employed to reduce the tearing during the delamination of the assist layer from the PMMA, an experiment was run to increase the thickness of the assist layer to get a "cleaner" separation.

V044 polymethyl methacrylate (PMMA) purchased from Arkema Inc. was dried for 12 hours at 79 degrees Celsius. The PMMA pellets were fed into a 25 mm single screw extruder, with a melt temperature of 235 degrees Celsius. The screw on the extruder was a standard single screw with a Maddox mixer, and the screw speed was adjusted so as to obtain a rate of 23 g/min.

The assist layer was prepared using Na214 LDPE purchased from Equistar Corp. The LDPE was undried, and was fed into another 25 mm single screw extruder which was operated at melt temperature of 228 degrees Celsius. The screw on the extruder was a standard single screw with a Maddox mixer, and the screw speed was adjusted so as to get a rate of 90 g/min.

The two polymers were brought together in a standard coextrusion feedblock in an ABA structure, where A is the assist layer (LDPE) and B is the molten PMMA. Thus, the molten PMMA was in the center, and the molten LDPE was equally divided in the outer layers.

The 3 molten layers were then coextruded through a standard 20 cm coat hanger die with a die gap of 0.64 mm, and quenched on a chill roll operating at a temperature of 27 degrees Celsius, and running at a speed of 30.5 m/min.

The LDPE was peeled off the PMMA, yielding a PMMA film which was 3 μm thick. The assist layer was delaminated with less difficulty than in example 3.

Hypothetical Example 5

To manufacture a very thin film pervaporation membrane to separate water from ethanol, the following method is contemplated, consistent with the invention.

A thermoplastic composition of polyvinyl alcohol (PVOH) and various plasticizers such as suggested in U.S. Pat. No. 5,051,222 "Method for making extrudable polyvinyl alcohol compositions" is prepared and dried at 66 degrees Celsius for 24 hours.

This composition by itself is not useful as a pervaporation membrane since it is water soluble. The method of this patent is used to diffuse a cross linking agent into the polyvinyl alcohol during extrusion in order to make the membrane water insoluble.

The dried thermoplastic PVOH is fed into a 25 mm single screw extruder, with a melt temperature of 232 degrees Celsius. The screw on the extruder is a standard single screw with a Maddox mixer, and the screw speed is adjusted so as to obtain a rate of 22 g/min.

The assist layer is prepared by thermoplastic compounding and pelletizing of Na214 LDPE purchased from Equistar Corp. with 5% gluteraldehyde. The LDPE/gluteraldehyde pellets are then dried at 66 degrees Celsius for 24 hours and fed into a 25 mm single screw extruder which is operated at a melt temperature of 218 degrees Celsius. The screw on the extruder is a standard single screw with a Maddox mixer, and the screw speed is adjusted so as to obtain a rate of 45 g/min.

The two polymers are brought together using a standard coextrusion die in an ABA structure, where A is the assist layer (LDPE) and B is the molten PVOH. Thus, the molten PVOH is in the center, and the molten LDPE/gluteraldehyde is equally divided in the outer layers. A coextrusion die is used rather than a coextrusion feedblock, since this reduces the contact time between the polymer layers, allowing diffusion of the gluteraldehyde from the assist layer to the film layer, but minimizing the time for cross linking which allows the PVOH to remain a thermoplastic for the time it is going through the die and the melt curtain. While the PVOH and LDPE/gluteraldehyde are in intimate contact, gluteraldehyde diffuses into the molten PVOH layer. The gluteraldehyde begins to cross link with the PVOH, but complete cross linking is not accomplished until the 3 molten layers have been coextruded and the melt curtain contacts the chill roll. The die gap of the multimanifold coextrusion die is 0.64 mm, and the melt curtain is quenched on a chill roll operating at a temperature of 27 degrees Celsius, and running at a speed of 30.5 m/min.

The LDPE is peeled off the cross linked PVOH, yielding a PVOH film which is 3 μm thick, and adequately cross linked to serve as a pervaporation membrane to separate water from ethanol.

Hypothetical Example 6

The object of example 6 is to make a laser welding film consistent with the invention. To laser weld acrylonitrile styrene butadiene (ABS) parts together, a very thin ABS film which absorbs infrared laser light is necessary. This is accomplished by manufacturing a highly filled, thin ABS film with 22% carbon black particles in a manner consistent with the invention. The film is useful as a laser welding film.

A mixture of 78% ABS and 22% carbon black is compounded in a manner well known in the art. The ABS/carbon black pellets are dried at 82 degrees Celsius for 4 hours.

The black ABS pellets are fed into a 25 mm single screw extruder, with a melt temperature of 238 degrees Celsius. The screw on the extruder is a standard single screw with a Maddox mixer, and the screw speed was adjusted so as to obtain a rate of 22 g/min.

The assist layer is prepared using Na214 low density polyethylene (LDPE) purchased from Equistar Corp. The LDPE is undried, and is fed into another 25 mm single screw extruder which is operated at a melt temperature of 238 degrees Celsius. The screw on the extruder is a standard single screw with a Maddox mixer, and the screw speed is adjusted so as to obtain a rate of 45 g/min.

The two polymers are brought together in a standard coextrusion feedblock in an ABA structure, where A is the assist layer (LDPE) and B is the molten black ABS. Thus, the highly filled molten black ABS is in the center, and the molten low density polyethylene is equally divided in the outer layers.

The 3 molten layers are then coextruded through a standard 20 cm coat hanger die with a die gap of 0.64 mm, and quenched on a chill roll operating at a temperature of 27 degrees Celsius, and running at a speed of 30.5 m/min.

The polyethylene is peeled off the black ABS, yielding a highly filled, black ABS film which is 3 μm in thickness.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including such equivalent construction insofar as they do not depart from the spirit and scope of the conception regarded as the present invention.

I claim:

1. A process for manufacturing thin free standing polymer films having a thickness less than 10 μm comprising the steps of:
   supplying a molten film layer stream by a first extruder;
   supplying a molten assist layer stream by a second extruder;
   intimately contacting the molten film layer stream and the molten assist layer stream in coplanar fashion;

extruding the film layer stream and at least one assist layer stream through a planar coextrusion die lip thereby forming a multilayer melt curtain;

stretching the multilayer melt curtain;

cooling the multilayer film thereby forming a multilayer film having at least one assist layer and a film layer;

delaminating the at least one assist layer from the film layer; and transporting the film layer to downstream processing operations.

2. The process of claim 1 wherein the film layer comprises a thin free standing polymer film having a substantially uniform thickness less than 10 μm.

3. The process of claim 2 wherein the film layer comprises an amorphous polymer.

4. The process of claim 3 wherein the amorphous polymer comprises a polymer selected from the group consisting of polycarbonate, polymethyl methacrylate, polysulfone, and combinations thereof.

5. The process of claim 2 wherein the film layer comprises a highly filled film selected from the group comprising an amorphous polymer, a semi crystalline polymer, and a crystalline polymer.

6. The process of claim 3 wherein the amorphous polymer comprises a polymer selected from the group consisting of atactic polystyrene, polyetherimide, polyimide, polyethersulfone, cyclic olefin copolymers, polyacetal, and combinations thereof.

7. The process of claim 2 wherein film layer stream comprises a composition selected from the group consisting of a highly filled amorphous polymer, a highly filled semicrystalline polymer, a highly filled crystalline polymer, a chemically reacted amorphous polymer, a chemically reacted semicrystalline polymer, a chemically reacted crystalline polymer, a cross linked amorphous polymer, a cross linked semicrystalline polymer, a cross linked crystalline polymer, an amorphous polymer that receives diffusible chemical addenda from the assist layer stream, a semicrystalline polymer that receives diffusible chemical addenda from the assist layer stream, a crystalline polymer that receives diffusible chemical addenda from the assist layer stream, an amorphous polymer having at least one incompletely reacted monomer or oligomer, a semicrystalline polymer having at least one incompletely reacted monomer or oligomer, a crystalline polymer having at least one incompletely reacted monomer or oligomer, and combinations thereof.

8. The process of claim 2 wherein film layer comprises two crystalline or semi-crystalline polymers selected from the group consisting of a highly filled thermoplastic polymer, a chemically reacted thermoplastic polymer, a cross linked thermoplastic polymer, a thermoplastic polymer that receives diffusible chemical addenda from the assist layer stream, and a thermoplastic polymer having at least one incompletely reacted monomer or oligimer.

9. The process of claim 5 wherein the highly filled film comprises an immiscible material filler selected from the group consisting of silica, barium sulfate, titanium dioxide, carbon black, carbon nanotubes, cross-linked polymer, calcium carbonate, and combinations thereof.

10. The process of claim 9 wherein the film layer comprises a thin free standing polymeric film having a substantially uniform thickness less than 10 μm having uniformly dispersed immiscible material filler.

11. The process of claim 9 wherein the highly filled film comprises a thermoplastic polymer selected from the group consisting of polycarbonate, polymethyl methacrylate, polysulfone and combinations thereof; and an immiscible material selected from the group consisting of silica, barium sulfate, titanium dioxide, carbon black, carbon nanotubes, cross-linked polymer, calcium carbonate, and combinations thereof.

12. The process of claim 2 wherein the film layer stream comprises a thermoplastic polymer having a polyvinyl alcohol, an ethylene glycol plasticizer, and a phosphoric acid stabilizer; and the assist layer stream comprises polyethylene and gluteraldehyde.

13. The process of claim 12 wherein the gluteraldehyde of the assist layer stream diffuses into and reacts with the polyvinyl alcohol of the film layer stream to form a chemically cross linked thermoplastic polymer film.

14. The process of claim 8 wherein the thermoplastic polymer that receives diffusible chemical addenda comprises a sulfonated polymer from the group consisting of sulfonated bisphenol A polyetherimide, sulfonated poly(arylene ether sulfone), and polyperfluorosulfonic acid and wherein the diffused chemical addenda comprises an amphoteric heterocycle proton solvent.

15. The process of claim 14 wherein the amphoteric heterocycle proton solvent comprises 1H-1,2,4 triazole.

16. The process of claim 3 wherein the film layer comprises a thermoplastic polymer with a first diffused chemical addenda diffused on a first side of the film layer and a second diffused chemical addenda diffused on a second side of the film layer.

17. The process of claim 16 wherein the first diffused chemical addenda comprises a compound selected from the group consisting of sulfur trioxide, chlorosulfonic acid, and a silyl chloride and the second diffused chemical addenda comprises a basic molecule.

18. The process of claim 17 wherein the basic molecule is a quaternary ammonium salt.

19. The process of claim 2 wherein the polymer film further comprises at least one functional film layer selected from the group consisting of an adhesive layer, an oxygen barrier layer, a moisture barrier layer, a thermoplastic polymer film layer, tie layer, compatibilizing layer, and combinations thereof.

20. The process of claim 19 wherein the adhesive layer comprises a compound selected from the group consisting of ethylene vinyl acetate, poly (ethylene methyl acrylic acid), maleic anhydride grafted polypropylene, a polyolefin elastomer produced from the metallocene catalyst technology, and combinations thereof.

21. The process of claim 19 wherein the oxygen layer comprises a compound selected from the group consisting of poly (ethylene vinyl alcohol), nylon 6, nylon 66, and combinations thereof.

22. The process of claim 19 wherein the moisture barrier layer comprises a compound selected from the group consisting of high density polyethylene, polypropylene, a polyethylene copolymer, a polypropylene copolymer, and combinations thereof.

23. The process of claim 2 wherein the assist layer stream comprises low density polyethylene and a compound selected from the group consisting of high molecular weight silicone, talc, slip agent, release agent, antioxidants, stabilizer and combinations thereof.

24. The process of claim 2 wherein the assist layer stream comprises a biaxially orientable polymer and the process further comprises the step of biaxially orienting the assist layer and the film layer after the step of cooling, thereby reducing a thickness of the film layer.

25. The process of claim 24 wherein the biaxially orientable polymer comprises a polymer selected from the group consisting of polyethylene terephthalate, polypropylene, nylon, and combinations thereof.

26. The process of claim 2 wherein cooling of the multilayer film takes place on an idle roll having a circumference and the delaminating occurs on the circumference of the idle roll.

27. The process of claim 2 wherein the assist layer stream comprises two polymeric streams disposed such that the film layer stream is between the two polymeric streams of the assist layer.

28. The process of claim 2 wherein the assist layer stream comprises three or more polymeric streams and the film layer comprises two or more polymer streams such that the assist layer stream and the film layer stream are extruded in an ABABA structure, where A is the assist layer stream and B is the film layer stream.

29. The process of claim 2 wherein the multilayer film is cooled below a vicat softening point of each the film layer and the assist layer.

30. The process of claim 2 wherein the process further comprises the step of supplying a molten interlayer stream by a third extruder;
    the step of intimately contacting the film layer stream and the assist layer stream further comprises intimately contacting the interlayer stream with the film layer stream, and the assist layer stream in coplanar fashion;
    the step of extruding the film layer stream and the assist layer stream further comprises intimately contacting the interlayer stream, the film layer stream and the assist layer stream and extruding such that the assist layer stream, the interlayer stream and the film layer stream are extruded in an ACB or ACBCA structure, where A is the assist layer stream, C is the interlayer stream and B is the film layer stream;
    wherein the multilayer film further comprises an interlayer wherein the interlayer stream aids in the delamination of the assist layer and the film layer; and
    the step of delaminating further comprises delaminating the interlayer from the assist layer and the film layer to obtain a final free standing very thin film.

31. The process of claim 30 wherein the interlayer comprises a short chain fluorocarbon with low thermodynamic affinity for the film layer.

32. The process of claim 2 wherein the assist layer stream comprises a low molecular weight HDPE and an LDPE such that interpenetration of the assist layer and the film layer is reduced to permit delamination without inducing a draw resonance.

33. A process for manufacturing thin free standing polymer films having a thickness less than 10 μm comprising the steps of:
    supplying a molten film layer stream by a first extruder wherein the molten film layer stream comprises a highly filled amorphous polymer;
    supplying a molten assist layer stream by a second extruder wherein the assist layer stream comprises a thermoplastic polymer with diffused chemical addenda;
    intimately contacting the molten film layer stream and the molten assist layer stream in coplanar fashion;
    extruding the film layer stream and at least one assist layer stream through a planar coextrusion die lip thereby forming a multilayer melt curtain;
    stretching the multilayer melt curtain;
    cooling the multilayer film thereby forming a multilayer film having at least one assist layer and a film layer wherein the film layer comprises a thin free standing polymer film having a uniform thickness less than 10 μm with a deviation of less than 2% therefrom;
    delaminating the at least one assist layer from the film layer; and
    transporting the film layer to downstream processing operations.

34. A process for manufacturing thin free standing polymer films having a thickness less than 10 μm comprising the steps of:
    supplying a molten film layer stream by a first extruder wherein the molten film layer stream comprises a highly filled semicrystalline polymer;
    supplying a molten assist layer stream by a second extruder wherein the assist layer stream comprises a thermoplastic polymer with diffused chemical addenda;
    intimately contacting the molten film layer stream and the molten assist layer stream in coplanar fashion;
    extruding the film layer stream and at least one assist layer stream through a planar coextrusion die lip thereby forming a multilayer melt curtain;
    stretching the multilayer melt curtain;
    cooling the multilayer film thereby forming a multilayer film having at least one assist layer and a film layer wherein the film layer comprises a thin free standing polymer film having a uniform thickness less than 10 μm with a deviation of less than 2% therefrom;
    delaminating the at least one assist layer from the film layer; and
    transporting the film layer to downstream processing operations.

* * * * *